United States Patent
Smith

(10) Patent No.: US 9,670,394 B2
(45) Date of Patent: Jun. 6, 2017

(54) DRILLING FLUID AND METHOD FOR DRILLING A WELLBORE

(71) Applicant: TECH-STAR FLUID SYSTEMS INC., Calgary (CA)

(72) Inventor: Carl Keith Smith, Calgary (CA)

(73) Assignee: CANADIAN ENERGY SERVICES L.P., Calgary (CA)

( * ) Notice: Subject to any disclaimer, the term of this patent is extended or adjusted under 35 U.S.C. 154(b) by 285 days.

(21) Appl. No.: 13/739,980

(22) Filed: Jan. 11, 2013

(65) Prior Publication Data

US 2013/0126243 A1 May 23, 2013

Related U.S. Application Data

(63) Continuation-in-part of application No. 12/529,583, filed as application No. PCT/CA2008/000425 on Mar. 3, 2008, now Pat. No. 8,387,723, application No. 13/739,980, filed on Jan. 11, 2013, which is a continuation-in-part of application No. PCT/CA2011/000973, filed on Aug. 26, 2011.

(60) Provisional application No. 61/750,291, filed on Jan. 8, 2013, provisional application No. 60/892,672, filed on Mar. 2, 2007, provisional application No. 61/377,202, filed on Aug. 26, 2010, provisional application No. 61/417,662, filed on Nov. 29, 2010.

(51) Int. Cl.
C09K 8/05 (2006.01)
C09K 8/20 (2006.01)

(52) U.S. Cl.
CPC ............. *C09K 8/05* (2013.01); *C09K 8/203* (2013.01); *C09K 8/206* (2013.01)

(58) Field of Classification Search
CPC ....... E21B 49/005; C09K 8/005; C09K 8/203; C09K 8/206
USPC .... 166/72, 65; 507/140, 141, 145, 269, 276, 507/277
See application file for complete search history.

(56) References Cited

U.S. PATENT DOCUMENTS

| | | | | |
|---|---|---|---|---|
| 3,654,164 A | * | 4/1972 | Russel | C09K 8/22 507/118 |
| 4,495,800 A | * | 1/1985 | Wilcox | C09K 8/16 73/61.63 |
| 4,664,818 A | * | 5/1987 | Halliday | C09K 8/24 507/113 |
| 4,664,843 A | | 5/1987 | Burba, III et al. | |
| 5,244,877 A | * | 9/1993 | Elward-Berry | C09K 8/206 507/112 |
| 5,260,269 A | | 11/1993 | Hale et al. | |
| 5,337,824 A | | 8/1994 | Cowan | |
| 5,351,759 A | * | 10/1994 | Nahm et al. | 166/293 |
| 5,363,918 A | | 11/1994 | Cowan et al. | |
| 5,439,056 A | | 8/1995 | Cowan | |
| 5,821,203 A | | 10/1998 | Williamson | |
| 5,975,220 A | | 11/1999 | Mueller et al. | |
| 6,025,303 A | * | 2/2000 | Keilhofer | C09K 8/145 252/184 |
| 6,148,917 A | | 11/2000 | Brookey et al. | |
| 7,199,085 B2 | | 4/2007 | Rea et al. | |
| 2003/0078306 A1 | | 4/2003 | Hoy | |
| 2003/0201103 A1 | | 10/2003 | Brookey et al. | |
| 2004/0099446 A1 | | 5/2004 | Schlemmer | |
| 2005/0003967 A1 | | 1/2005 | Rea et al. | |
| 2005/0022992 A1 | | 2/2005 | Di Lullo Arias et al. | |
| 2006/0019834 A1 | | 1/2006 | Melbouci et al. | |
| 2007/0135311 A1 | | 6/2007 | Van Der Horst | |
| 2007/0197399 A1 | | 8/2007 | Sau et al. | |
| 2010/0089650 A1 | * | 4/2010 | Stoian | C09K 8/16 175/65 |

FOREIGN PATENT DOCUMENTS

| | | |
|---|---|---|
| CA | 2679922 | 9/2008 |
| CN | 1560180 | 1/2006 |
| CN | 1696240 | 12/2006 |
| WO | 2012/024786 | 3/2012 |

* cited by examiner

*Primary Examiner* — Silvana Runyan
(74) *Attorney, Agent, or Firm* — Bennett Jones LLP

(57) ABSTRACT

A method for drilling a wellbore into a formation uses a mixed metal-viscosified drilling fluid including at least 1% potassium salt and/or at least 0.05% calcium sulfate; circulating the drilling fluid through the well; and drilling into a formation. An anionic thinner may be added if the clay concentration of the drilling fluid reaches a problematic level to adversely affect pumpability of the fluid.

41 Claims, No Drawings

DRILLING FLUID AND METHOD FOR DRILLING A WELLBORE

FIELD

This invention relates to methods and fluids used for drilling wells.

BACKGROUND

The process of drilling a hole in the ground for the extraction of a natural resource requires a fluid for removing the cuttings from the wellbore, lubricating and cooling the drill bit, controlling formation pressures and maintaining hole stability.

Many formations present difficulties for drilling, as the formation materials which the drilling fluid contacts, can adversely affect the properties of the drilling fluid.

For example, a fluid that minimizes formation damage and reduces whole mud loss by limiting invasion into the formation and permits easy flow back has been developed, termed herein the mixed metal-viscosified drilling fluids including mixed metal oxide (MMO), mixed metal hydroxide (MMH) and combinations of mixed metal oxide and hydroxide (MMOH). The mixed metal-viscosified drilling fluids contain a mixed metal viscosifier, which is an inorganic particle based on magnesium/aluminum oxides and/or hydroxides. The mixed metal particles have a cationic character and react electrostatically with clay particles. Mixed metal-viscosified drilling fluids include an aqueous-based mixture of at least one of the mixed metal moieties and an amount of bentonite. The rheology of mixed metal-viscosified drilling fluids limits fluid invasion into the formation due to high viscosity but the main formation protection comes from the formation of an external filter cake that is easy to remove. Simple displacement to water or brine should be sufficient for the well to flow back and remove the filter cake.

Unfortunately, however, the rheology of mixed metal-viscosified drilling fluids has broken down when coming into contact with coal fines generated from drilling into coal seams, especially young coal. When the drilling fluid comes in contact with coal fines generated by drilling through the seams, the fluid thins, moving toward the rheology of water and therefore loses many of its beneficial properties. Since coal seams are, in fact, often considered loss zone formations, and are weak and friable, the unsuitability of mixed metal-viscosified drilling fluids for drilling in coal containing formations is particularly problematic.

In addition to the well known sensitivity of mixed metal-viscosified drilling fluids to anionic compounds such as coal, these systems are also sensitive to the incorporation of reactive drilled clays in so far as such incorporated clays increase the viscosity of the fluid to uncontrollable levels and render the system unsuitable. As an example, the clay content of a drilling fluid is measured as an equivalent activity to the amount of bentonite that is added to the system and is tested quantitatively as the Methylene Blue Test (MBT). Increasing the MBT value of a mixed metal-viscosified drilling fluid from 10 pounds per barrel (ppb) bentonite equivalent (28.6 kg/m$^3$) to 20 ppb bentonite equivalent (57.2 kg/m$^3$) can render a fluid system unpumpable and unusable.

SUMMARY OF THE INVENTION

In accordance with a broad aspect of the present invention, there is provided a method for drilling a well through a formation, the method comprising: providing a mixed metal-viscosified drilling fluid including at least 1% w/v potassium salt and/or at least 0.5% w/v calcium sulfate; circulating the drilling fluid through the well; and drilling into the formation.

In accordance with another broad aspect of the present invention, there is provided a drilling fluid comprising: an aqueous mixture of bentonite and a mixed metal viscosifier with a pH above about pH 10; and at least 1% potassium salt and/or at least 0.5% w/v calcium sulfate.

In accordance with a broad aspect of the present invention, there is provided a method for drilling a well through a formation, the method comprising: providing a mixed metal-viscosified drilling fluid; circulating the drilling fluid through the well while drilling into the formation; identifying a condition of drilling indicative of a problematic increase in the clay concentration of the drilling fluid; adding a potassium salt to the drilling fluid to bring the concentration to at least 1% w/v potassium salt and/or at least 0.5% w/v calcium sulfate; and adding an anionic thinner to the drilling fluid to adjust the viscosity of the drilling fluid.

It is to be understood that other aspects of the present invention will become readily apparent to those skilled in the art from the following detailed description, wherein various embodiments of the invention are shown and described by way of example. As will be realized, the invention is capable for other and different embodiments and its several details are capable of modification in various other respects, all without departing from the spirit and scope of the present invention. Accordingly the detailed description and examples are to be regarded as illustrative in nature and not as restrictive.

DESCRIPTION OF VARIOUS EMBODIMENTS

The detailed description and examples set forth below are intended as a description of various embodiments of the present invention and are not intended to represent the only embodiments contemplated by the inventor. The detailed description includes specific details for the purpose of providing a comprehensive understanding of the present invention. However, it will be apparent to those skilled in the art that the present invention may be practiced without these specific details.

Mixed metal-viscosified drilling fluids include a mixed metal viscosifier, which is an inorganic particle based on magnesium/aluminum oxides and/or hydroxides. They are commonly known as mixed metal hydroxides and sometimes referred to as mixed metal oxide (MMO), mixed metal hydroxide (MMH) and combinations of mixed metal oxide and hydroxide (MMOH). Mixed metal viscosifier, sometimes collectively referred to as MMH, is a mixed metal layered hydroxide compound of the following empirical formula:

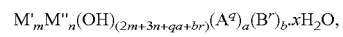

$$M'_m M''_n (OH)_{(2m+3n+qa+br)} (A^q)_a (B^r)_b \cdot xH_2O,$$

where M' represents at least one divalent metal cation and m is an amount of from greater than zero to about 8; where M" represents at least one trivalent metal cation and n is an amount of from greater than zero to about 6; where A is an anion or negative-valence radical that is monovalent or polyvalent, and a is an amount of A ions of valence q, provided that if A is monovalent, a is from greater than zero to about 8, and if A is polyvalent, a is from greater than zero to about 4; where B is a second anion or negative-valence radical that is monovalent or polyvalent, and where b is an amount of B ions of valence r and b is from zero to about 4; provided (m+n) is greater than or equal to 1; further provided qa+br cannot be greater than 2m+3n; provided that qa cannot equal 2m+3n; and still further provided that (2m+3n+qa+br) is less than 3; and where $xH_2O$ represents excess waters of hydration, with x being zero or more. In certain preferred embodiments (2m+3n+qa+br) is less than 2, more preferably less than 1, and most preferably less than 0.5.

While M' can represent any divalent metal cation of the Groups IA, IIA, VIIB, VIII, IB or IIB of the Periodic Table, preferred divalent cations are Mg, Ca, Mn, Fe, Co, Ni, Cu, and Zn, and more preferred are Mg and Ca. M" is a trivalent metal cation selected from Groups IA or VIII, but preferred are Al, Ga and Fe, and more preferred is Al.

There must also be present at least one anion or negative-valence radical, A, and in some cases one (or more) additional anions or negative-valence radicals, B, may also be present. Examples of these anions and negative-valence radicals include carbonates, amines, amides, chlorides, oxides, and the like. Preferred therefor are carbonates, oxides and amides.

Alternatively, a combination of materials which can contribute the proportions of constituents of the above empirical formula can be employed.

One mixed metal viscosifier of interest is the mixed metal hydroxide of the formula $[Mg_{0.7}Al_{0.3}(OH)_2](OH)_{0.3}$. Another mixed metal viscosifer of interest is $Al/Mg(OH)_{4.7}Cl_{0.3}$. Mixed metal viscosifiers are commercially available such as from BASF Oilfield Polymers Inc. under the trademark Polyvis™. For example, Polyvis II™ is a mixed metal hydroxide viscosifier.

Until now mixed metal (MMO, MMH and MMOH or collectively MMH) viscosified drilling fluids have been used generally unsuccessfully in coal seams due to the fluid thinning effect from the coal. It is believed that the polyanionic nature of coal fines, such as of lignite and lignosulfonates, interfere with the electrostatic interactions of the mixed metal moiety and the bentonite in the drilling fluid, sometimes resulting in a complete collapse of the fluid's rheology.

We have determined that some salts reduce or prevent the thinning effect from drilling coals with MMH viscosified fluids. Calcium sulfate and/or potassium salts including one or more of potassium sulfate, potassium chloride, potassium acetate and potassium formate may substantially maintain the rheology of mixed metal-viscosified drilling fluids when drilling with coal contaminants. Such salts may add a benefit of shale swelling inhibition, possibly as a result of the presence of the potassium ion or calcium ion from the salt.

Potassium sulfate and/or potassium chloride have shown the best results with potassium sulfate being particularly preferred.

A wide range of potassium salt concentrations, such as concentrations greater than 1% (weight by volume), may be effective in the mixed metal-viscosified drilling fluid. Generally concentrations of 1-10% (weight by volume) salt and, for example, 1-5% salt (weight by volume) concentrations have been found to be both effective for stabilizing the drilling fluid against adverse rheological changes due to coal contamination and advantageous in terms of economics. The amount of salt added to the drilling fluid may be determined by the amount of coal to be drilled and/or by the shale reactivity. For example, younger coals, more so than older coals, tend to create greater rheological instability for mixed metal-viscosified drilling fluids and, thus, higher concentrations (for example greater than 3% and for example 3-10%) of potassium salts in the drilling fluid may be useful. Also, if it is determined that there are significant coal deposits through which the well must be drilled, again higher concentrations of potassium salts may be useful.

For calcium sulfate, concentrations greater than 0.05% (weight by volume), may be effective in the mixed metal-viscosified drilling fluid. While amounts of up to 5% or more may be used, generally concentrations of 0.05%-1.0% (weight by volume) calcium sulfate and, for example, 0.05-0.5% salt (weight by volume) or 0.1-0.5% concentrations have been found to be both effective for stabilizing the drilling fluid against adverse rheological changes due to coal contamination and advantageous in terms of economics. In younger coals or where significant coal deposits must be drilled, higher concentrations (for example greater than 0.3% and for example 0.3-1.0%) of calcium sulfate in the drilling fluid may be useful. It is believed that the calcium sulfate reaches saturation at about 2 to 3 kg/m3, (0.2 to 0.3% (w/v)), but excess amounts may be added without an adverse effect and in fact may create a buffer of salt to maintain activity, provided the fluid remains a liquid which can be circulated through the wellbore. Generally, based on a cost/benefit analysis, an upper limit of 1.0% or more likely 0.5% is considered sound.

Although the salt may be added after the coal contamination occurs, it is recommended to pre-treat the system for best results. In one embodiment, for example, the surface hole can be drilled down to approximately the level of the first coal deposit using any drilling fluid of interest, including for example, prior art mixed metal-viscosified drilling fluids. When it is determined that the coal seam is close below bottom hole or when the coal seam has been reached, the drilling fluid may be changed over to a drilling fluid according to the present invention, including a mixed metal-viscosified drilling fluid containing an amount of a potassium salt and/or an amount of calcium sulfate.

Alternately, the borehole may be drilled down to and through a coal seam using a drilling fluid according to the present invention. For example, the entire well substantially from surface, which it will be appreciated may include drilling from surface or from below the overburden or after the casing point, may be drilled using a drilling fluid according to the present invention.

After drilling through the coal seams in the path of the borehole, the present drilling fluid may continue to be used for the remainder of the wellbore or other drilling fluids may be used. However, if coal fines may continue to become entrained in the drilling fluid, for example where a coal seam remains open to contact by the drilling fluid, it may be useful to continue using the present drilling fluid until drilling is complete or the possibility of coal contamination is eliminated. If desired, the drilling fluid returning to the mud tanks at surface may be monitored to determine the concentration of potassium salt or calcium sulfate therein, as well as other parameters, to ensure that appropriate levels and fluid characteristics are maintained. For example, any one or more of the bentonite, mixed metal viscosifier, base, or potassium salt and/or calcium sulfate may be added during drilling to adjust the drilling fluid parameters. In one embodiment, for example, an amount of mixed metal viscosifier may be added to the fluid during the course of a drilling operation where reactive formations are drilled and drill cuttings become incorporated to and change the rheology of the drilling fluid. In such a case, the addition of an amount of mixed metal viscosifier can cause the viscosity of the fluid to increase.

As will be appreciated, the drilling fluid may be circulated through the drill string, drill bit and well bore annulus while drilling. Circulation of the drilling fluid may continue even when drilling is stopped in order to condition the well, prevent string sticking, etc.

During the drilling and circulation, the yield point of the drilling fluid may be maintained above 10 Pa to provide advantageous effects.

Mixed metal-viscosified drilling fluids include bentonite and a mixed metal viscosifier in water and are pH controlled.

Bentonite is commonly used in drilling fluids and its use will be well understood by those skilled in the art. An untreated bentonite may be particularly useful. Such a bentonite may be known commercially as untreated bentonite with a high content of sodium montmorillonite, natural bentonite or untreated Wyoming bentonite.

Generally, mixed metal-viscosified drilling fluids may include low concentrations of bentonite (for example, about 15 to 45 kg/m3 or 20 to 40 kg/m3 bentonite in fresh water). Sea water-based mixed metal-viscosified drilling fluids can accommodate more bentonite, as will be appreciated. Considering that many bentonite based (non-mixed metal) drilling fluids can contain many multiples more (i.e. two to four times) bentonite than in a mixed metal-viscosified drilling fluid, it can be appreciated that the viscosity generated using such low concentrations of bentonite for mixed metal-viscosified drilling fluids might be insufficient for hole cleaning. The addition of mixed metal oxide, mixed metal hydroxide or mixed metal oxide and hydroxide at a weight ratio of 1:8 to 1:12 or 1:9.5 to 1:10.5 to the bentonite produces a stable fluid when the pH is initially maintained above about 10.0 and possibly between about 10.5 and 13, as may be achieved by addition of caustic soda, caustic potash, potassium carbonate and/or soda ash. Once the bentonite/mixed metal viscosifier reaction is complete and a gel is formed, it appears that the pH can be lowered to pH 9 or possibly even lower without any significant loss in viscosity.

In one embodiment, a mixed metal-viscosified drilling fluid may include an aqueous mixture of about 30 kg/m3 bentonite, a mixed metal moiety in a quantity of about 1:10 MMO, MMH or MMOH to bentonite, pH controlled to greater than pH 11 and 1 to 5% potassium salt and/or 0.05 to 1.0% calcium sulphate.

Additives for fluid loss control, lost circulation, etc. may be added to the drilling fluid mixture, as desired. Non or minor-ionic additives may be most useful. Some examples may include starch for fluid loss reduction, organophillic lost circulation materials (LCM), etc. Simple testing may verify the compatibility of any particular additive with the drilling fluid.

To produce the drilling fluid, the bentonite may first be hydrated in water. Then the mixed metal moiety is added and pH is adjusted. The potassium/calcium salt can be added to the aqueous mixture of bentonite and mixed metal any time when it is needed for drilling with coal contamination. Additives such as LCM, fluid loss control agents, etc. can also be added when appropriate, as will be appreciated.

A typical drilling fluid formulation may be according to Table 1.

TABLE 1

A typical drilling fluid according to the invention

| Product | Concentration | Notes |
| --- | --- | --- |
| Untreated bentonite | 30 kg/m3 | Prehydrate first in fresh water |

TABLE 1-continued

A typical drilling fluid according to the invention

| Product | Concentration | Notes |
| --- | --- | --- |
| MMH or MMO or MMOH | 3 kg/m3 | |
| Caustic Soda | 0.5 to 1 kg/m3 | To control pH at 11-12.5 |
| Potassium Sulfate | 20 to 50 kg/m3 | |
| Starch | 5 to 10 kg/m3 | |

The mixed metal-viscosified drilling fluids described herein are useful for successfully drilling into coal and lignite containing formations. Even when contacting coal, such fluids retain their advantageous properties such as relatively high yield points, high low end rheology and high and fragile gel strengths. Such properties are advantageous for use in drilling oil and gas wells, whether vertical, directional or horizontal due to superior hole cleaning capabilities and because these fluids mitigate against whole mud fluid losses to formations whether via formation fractures or high permeability sections.

In particular this new fluid has the advantage over the conventional MMH based fluids that are very sensitive to the addition or incorporation of any anionic chemicals or minerals including coal, many drilling fluid additives that function as thinners such as lignites, humalites, tannins, polyanionic celluloses, sodium acid pyrophosphate, with a chemical formula of $Na_2H_2P_2O_7$ (SAPP, sometimes identified as a dispersant, but acts as a thinner in MMH fluids), or xanthan gum (sometimes identified as a viscosifier, but acts as a thinner in MMH fluids), all of which will cause the rheology of conventional MMH-bentonite based fluids to collapse and thin.

The addition of salts, such as for example potassium sulfate, in sufficient amounts as noted above, prevents the collapse of the unique visco-elastic properties of the MMH-bentonite fluids when exposed to coal or lignite almost completely and it is possible to drill through coal seams, even horizontally where significant coal contact may be encountered. The use of such a fluid mitigates against whole fluid loss into the coal formation, which are typically highly fractured due to the unique rheological properties of the fluid.

As mentioned the rheology of mixed metal-viscosified drilling fluids is sensitive to increases in clay content, as may occur when drilling sedimentary formations. As noted above, mixed metal-viscosified drilling fluid systems can only operate within a relatively narrow range of active clay concentrations. If such a system does incorporate a significant amount of water-reactive clays, it will develop a problematic rheological profile for example a large increase in viscosity.

Even with the present drilling fluid, incorporating high concentrations of clay causes problematic rheology. In fact, drilling with the present drilling fluid through active, young clay zones, with unavoidable incorporation of clay, may increase fluid rheology, such that the drilling fluid may become substantially unusable (i.e. unpumpable). Addition of an anionic thinner to the present drilling fluid controls the rheology and permits continued drilling.

Thus, a method for drilling a well through a formation includes: providing a mixed metal-viscosified drilling fluid; circulating the drilling fluid through the well while drilling into the formation; identifying a condition of drilling indicative of an increase in the clay content of the drilling fluid; adding a potassium salt to the drilling fluid to bring the concentration to at least 1% w/v potassium salt; and adding an anionic thinner to the drilling fluid to adjust the viscosity of the drilling fluid.

Alternately, 0.05 to 1.0% w/v calcium sulfate may be employed in the method in place of or in addition to the potassium salt.

Without the addition of a potassium salt or the calcium sulfate, the use of anionic thinners would reduce the viscosity of the mixed metal-viscosified drilling fluid to nearly that of water.

The formation can be at any depth, any orientation and through any rock type, such as for example, through carbonates, sandstones, shales, oil shales, etc. The formation can be one known to contain clay or otherwise.

The mixed metal-viscosified drilling fluid can be according to that described above: an aqueous mixture of a mixed metal viscosifier, as described above, and bentonite, as described above, with pH control, as described above.

The process of identifying a condition of drilling indicative of an increase in the clay content of the drilling fluid may vary. For example, the step of identifying may consider the location of the hole being drilling, for example using drilling measurements, relative to the location of known clay deposits, for example using formation logs. If it is determined that the hole being drilled may, or is going to, pass through problematic clay deposits, then this can be noted according to the method and the step of adding an anionic thinner may be initiated when or before the drilling process begins in the clay deposit. Alternately or in addition, fluid rheology can be monitored, the viscosity of the fluid can be measured or the concentration of clay in the drilling fluid can be monitored directly to identify a condition indicative of an increase in the clay concentration.

In one embodiment, for example, the methylene blue test (MBT) procedure can be employed to quantitatively analyze the clay content of the drilling fluid.

In another embodiment, the fluid viscosity may be monitored as by determining the funnel viscosity or more accurately with a device such as a rheometer, such as a Fann 35 rheometer. When the viscosity increases beyond an acceptable level, a condition indicative of an increase in clay content is identified.

The salt (potassium salt and/or calcium sulfate) may be added to the drilling fluid at any time. For example, the salt may be added during the initial production of the drilling fluid, such that the salt is present in the system throughout the drilling operation or the salt may be added only after identifying a condition of drilling indicative of an increase in the clay content of the drilling fluid. Although the salt may be added after problematic clay contamination occurs, it is recommended to pre-treat the system for best results. In one embodiment, for example, the surface hole can be drilled down to approximately the level of the first clay deposit using any drilling fluid of interest, including for example, prior art mixed metal-viscosified drilling fluids. When it is determined that a clay deposit is close below bottom hole or when the clay deposit has been reached, the drilling fluid may be changed over to one including a mixed metal-viscosified drilling fluid containing an amount of a salt. Alternately, if a mixed metal-viscosified drilling fluid is already being employed, a salt may be added to the mixed-metal viscosified drilling fluid.

Alternately, the borehole may be drilled down to and into a clay deposit using a mixed metal-viscosified drilling fluid containing greater than 1% w/v potassium salt and/or greater than 0.05% calcium sulfate. For example, the entire well substantially from surface, which may include drilling from surface or from below the overburden or after the casing point, may be drilled using a drilling fluid including a mixed metal viscosifier, bentonite and the appropriate amount of the salt.

Potassium salts including one or more of potassium sulfate, potassium chloride, potassium acetate and potassium formate may be useful. Potassium sulfate and/or potassium chloride have shown the best results with potassium sulfate being particularly preferred.

A wide range of potassium salt concentrations equal to or greater than 1% (weight by volume) may be effective in the mixed metal-viscosified drilling fluid. Generally concentrations of 1-10% (weight by volume) salt and, for example, 1-5% salt (weight by volume) concentrations have been found to be effective for stabilizing the drilling fluid for the addition of thinners, while being acceptable in terms of economics. The amount of salt added to the drilling fluid may be determined by the amount of thinner to be added.

For calcium sulfate, concentrations greater than 0.05% (weight by volume), may be effective in the mixed metal-viscosified drilling fluid. While amounts of up to 5% or more may be used, generally concentrations of 0.05%-1.0% (weight by volume) calcium sulfate and, for example, 0.05-0.5% salt (weight by volume) or 0.1-0.5% concentrations have been found to be both effective for stabilizing the for the addition of thinners, while being acceptable in terms of economics. The amount of salt added to the drilling fluid may be determined by the amount of thinner to be added.

While the anionic thinner could be added at any time, generally the anionic thinner may be added to the drilling fluid after identifying a condition indicating that the drilling fluid has an increased clay concentration. For example, the anionic thinner may be added when it is expected that the wellbore will be drilled into a clay deposit. Normally, however, thinner is added after problematic clay contamination occurs. Once the clay concentration or the viscosity indicates a problematic clay content, the thinner may be added. In one embodiment, for example, thinner is added to address problematic rheological profiles.

The condition indicating that there is a problematic clay content may vary depending on the equipment and operator's preferences. The fluid must be pumpable and thinner may be added to ensure that the drilling fluid remains pumpable. In some example embodiments, thinner may be added as follows:

a) when funnel viscosity reaches 70 seconds/quart (approximately equal to 70 s/liter) or possibly when funnel viscosity reaches 60 seconds/quart;
b) when the Fann 35 YP reaches 55 Pa to 60 Pa or possibly when the yield point reaches 50 Pa (at yield point=60 Pa pumping generally becomes problematic for most rigs);
c) using MBT for freshwater based fluids, when the test indicates clay at ≥20 ppb or possibly ≥13 ppb; or
d) using MBT for saltwater based fluids, when the test indicates clay at ≥40 ppb or possibly ≥25 ppb.

Anionic thinners of interest are anionic chemicals or minerals including coal fines, lignite, lignite resin, sulfomethylated lignite, lignosulfonate, humalite, tannin including sulfonated tannin (which is for example, available as Desco™), sodium asphalt sulfonate, poly-anionic cellulose, penta potassium pyrophosphate (PKPP), sodium acid pyrophosphate, for example with a chemical formula of $Na_2H_2P_2O_7$ (SAPP, sometimes identified as a dispersant, but acts as a thinner in MMH fluids), tetra sodium pyrophosphate (TKPP), sulphomethylated phenolic resin or xanthan gum (sometimes identified as a viscosifier, but acts as a thinner in MMH fluids). A plurality of these thinners may be used in combination in some applications.

The above-noted thinners may be added to the circulating drilling fluid. If the thinner is free flowing liquid or powder, it may be added directly.

The thinner is added in an amount sufficient to bring the fluid parameters below the above-noted levels. For example, thinner may be added and the fluid viscosity monitored and the thinner is added until the fluid has a viscosity is reduced to less than YP=60 Pa or in some embodiments below YP=55 Pa or possibly until the yield point is less than 50 Pa (for example measured using a Fann 35 rheometer). In any event, during the drilling and circulation, the yield point of the drilling fluid should be maintained above 10 Pa to provide advantageous effects.

While the actual amounts of thinner used to achieve this above-noted rheological profile will vary depending on the activity of the thinner (i.e. lignite is a less active thinner than sulfonated tannin, and sulfonated tannin is a less active thinner than SAPP), the amount of clay contamination, etc. Some ranges for example thinners have been proposed, as follow: lignite may be useful in a range of 0.5 to 20 ppb or more usually 1 to 5 ppb; sulfonated tannin such as methyl ester of sulfonated tannin (Desco CF™) may be useful in a range of 0.05 to 10 ppb or more usually 0.1 to 5 ppb; and SAPP may be useful in a range of 0.02 to 10 ppb or more usually 0.1 to 5 ppb.

After drilling through the one or more clay deposits in the path of the borehole, the present drilling fluid may continue to be used for the remainder of the wellbore or other drilling fluids may be used. However, if clay can continue to become entrained in the drilling fluid, for example where a clay deposit remains open to contact by the drilling fluid, it may be useful to continue using the present drilling fluid until drilling is complete or the possibility of clay contamination is eliminated. If desired, the drilling fluid returning to the mud tanks at surface may be monitored to determine the concentration of salt and thinner therein, and/or other parameters indicative of problematic clay content, to ensure that fluid characteristics are maintained. For example, any one or more of the bentonite, mixed metal viscosifier, base, salt or anion thinner may be added during drilling to adjust the drilling fluid parameters. In one embodiment, for example, an amount of mixed metal viscosifier may be added to the fluid during the course of a drilling operation where reactive formations are drilled and drill cuttings become incorporated to, and change the rheology of, the drilling fluid. In such a case, the addition of an amount of mixed metal viscosifier can cause the viscosity of the fluid to increase. In another embodiment, for example, an initial amount of an anionic thinner and further amounts of that or another anionic thinner may be added to the fluid during the course of a drilling operation where reactive clay formations are drilled and clay becomes incorporated to, and changes the rheology of, the drilling fluid. In such a case, the addition of an amount of thinner can cause the viscosity of the fluid to decrease.

As noted above, other additives may be employed in the drilling fluid such as starch for fluid loss reduction, organophillic lost circulation materials (LCM), etc. Simple testing may verify the compatibility of any particular additive with the drilling fluid.

To produce the drilling fluid, the bentonite may first be hydrated in water. Then the mixed metal moiety is added and pH is adjusted. The salt can be added to the aqueous mixture of bentonite and mixed metal with or before the thinner. Additives such as LCM, fluid loss control agents, etc. can also be added when appropriate, as will be appreciated.

The following examples are included for the purposes of illustration only, and are not intended to limit the scope of the invention or claims.

EXAMPLES

Example I

Drilling Fluids with Coal Contamination

In Example I, drilling fluids were prepared according to the sample descriptions by hydrating the bentonite, adding the mixed metal moiety and adjusting the pH, as needed. Thereafter, any additives, including potassium salt if any, were added.

To simulate coal contamination, lignite was added.

The rheological properties have been tested using a Fann 35 and Brookfield viscometers.

TABLE 2

Composition of Sample #1

| Products | Sample #1 |
|---|---|
| Untreated Bentonite | 30 kg/m$^3$ |
| MMH | 3 kg/m$^3$ |
| Caustic | 0.5 kg/m$^3$ |
| Starch | 10 kg/m$^3$ |

TABLE 3

Results without the addition of Salt

| Mud Properties | Sample #1 | Sample #1 + 5 kg/m3 Lignite | Sample #1 + 15 kg/m3 Lignite |
|---|---|---|---|
| 600 RPM | 86 | 47 | 43 |
| 300 RPM | 64 | 29 | 25 |
| 200 RPM | 53 | 21 | 18 |
| 100 RPM | 40 | 13 | 10 |
| 6 RPM | 19 | 2 | 1.5 |
| 3 RPM | 17 | 1 | 1 |
| 10 sec Gel (Pa) | 8 | 1 | 0.5 |
| PV (mPa*s) | 22 | 18 | 18 |
| YP (Pa) | 21 | 5.5 | 3.5 |
| LSRV (cP) | 54,000 | 12,000 | 0 |
| Temperature (° C.) | 22.8 | 22.3 | 23.0 |

TABLE 4

Results using Potassium Chloride

| Mud Properties | Sample #1 + 2% KCl | Sample #1 + 2% KCl + 5 kg/m3 Lignite | Sample #1 + 2% KCl + 15 kg/m3 Lignite |
|---|---|---|---|
| 600 RPM | 66 | 47 | 44 |
| 300 RPM | 52 | 31 | 27 |
| 200 RPM | 46 | 23 | 21 |
| 100 RPM | 38 | 16 | 14 |
| 6 RPM | 18 | 4 | 3 |
| 3 RPM | 16 | 3 | 2 |
| 10 sec Gel (Pa) | 7 | 2 | 1.5 |
| PV (mPa*s) | 14 | 16 | 17 |
| YP (Pa) | 19 | 7.5 | 5 |

TABLE 4-continued

Results using Potassium Chloride

| Mud Properties | Sample #1 + 2% KCl | Sample #1 + 2% KCl + 5 kg/m3 Lignite | Sample #1 + 2% KCl + 15 kg/m3 Lignite |
|---|---|---|---|
| LSRV (cP) | 25,000 | 12,000 | 9,000 |
| Temperature (° C.) | 21.6 | 22.1 | 22.3 |

TABLE 5

Results using Potassium Acetate

| Mud Properties | Sample #1 + 2% Pot. Acetate | Sample #1 + 2% Pot. Acetate + 5 kg/m3 Lignite | Sample #1 + 2% Pot. Acetate + 15 kg/m3 Lignite |
|---|---|---|---|
| 600 RPM | 66 | 52 | 48 |
| 300 RPM | 47 | 38 | 35 |
| 200 RPM | 39 | 32 | 29 |
| 100 RPM | 30 | 25 | 22 |
| 6 RPM | 12 | 10 | 10 |
| 3 RPM | 8 | 8 | 7 |
| 10 sec Gel (Pa) | 4 | 4 | 4 |
| PV (mPa*s) | 13 | 14 | 13 |
| YP (Pa) | 20 | 12 | 5.5 |
| LSRV (cP) | 31,000 | 20,000 | 12,000 |
| Temperature (° C.) | 23.2 | 23.3 | 23.2 |

Note:
Lignite dissolves slower.

TABLE 6

Results using Potassium Formate

| Mud Properties | Sample #1 + 2% Pot. Formate | Sample #1 + 2% Pot. Formate + 5 kg/m3 Lignite | Sample #1 + 2% Pot. Formate + 15 kg/m3 Lignite |
|---|---|---|---|
| 600 RPM | 66 | 47 | 42 |
| 300 RPM | 53 | 32 | 28 |
| 200 RPM | 47 | 26 | 22 |
| 100 RPM | 38 | 18 | 16 |
| 6 RPM | 19 | 6 | 5 |
| 3 RPM | 18 | 4 | 4 |
| 10 sec Gel (Pa) | 7 | 2 | 2 |
| PV (mPa*s) | 13 | 15 | 14 |
| YP (Pa) | 20 | 8.5 | 7 |
| LSRV (cP) | 21,000 | 13,000 | 12,000 |
| Temperature (° C.) | 22.1 | 22.3 | 22.6 |

TABLE 7

Results using Calcium Nitrate

| Mud Properties | Sample #1 + 2% Calcium Nitrate | Sample #1 + 2% Calcium Nitrate + 5 kg/m3 Lignite | Sample #1 + 2% Calcium Nitrate + 15 kg/m3 Lignite |
|---|---|---|---|
| 600 RPM | 60 | 57 | 47 |
| 300 RPM | 46 | 42 | 34 |
| 200 RPM | 38 | 34 | 28 |
| 100 RPM | 31 | 27 | 22 |
| 6 RPM | 12 | 11 | 7 |
| 3 RPM | 9 | 9 | 5 |
| 10 sec Gel (Pa) | 5 | 5 | 3 |
| PV (mPa*s) | 14 | 15 | 13 |
| YP (Pa) | 16 | 13.5 | 10.5 |
| LSRV (cP) | 33,000 | 23,000 | 22,000 |
| Temperature (° C.) | 21.5 | 22.1 | 22.7 |

Note:
Lignite dissolves slower.

TABLE 8

Results using Calcium Chloride

| Mud Properties | Sample #1 + 2% Calcium Chloride | Sample #1 + 2% Calcium Chloride + 5 kg/m3 Lignite | Sample #1 + 2% Calcium Chloride + 15 kg/m3 Lignite |
|---|---|---|---|
| 600 RPM | 61 | 51 | 47 |
| 300 RPM | 44 | 35 | 34 |
| 200 RPM | 36 | 30 | 29 |
| 100 RPM | 27 | 22 | 23 |
| 6 RPM | 10 | 8 | 8 |
| 3 RPM | 8 | 7 | 6 |
| 10 sec Gel (Pa) | 3.5 | 3.5 | 3 |
| PV (mPa*s) | 17 | 16 | 13 |
| YP (Pa) | 13.5 | 9.5 | 10.5 |
| LSRV (cP) | 27,000 | 23,000 | 22,000 |
| Temperature (° C.) | 24.4 | 24.4 | 24.2 |

Note:
Lignite dissolves slower.

TABLE 9

Results using Potassium Sulfate

| Mud Properties | Sample #1 + 2% Pot. Sulfate | Sample #1 + 2% Pot. Sulfate + 5 kg/m3 Lignite | Sample #1 + 2% Pot. Sulfate + 15 kg/m3 Lignite |
|---|---|---|---|
| 600 RPM | 75 | 42 | 34 |
| 300 RPM | 60 | 29 | 21 |
| 200 RPM | 52 | 24 | 16 |
| 100 RPM | 41 | 18 | 11 |
| 6 RPM | 21 | 8 | 2.5 |
| 3 RPM | 19 | 7 | 2 |
| 10 sec Gel (Pa) | 9 | 4 | 2.5 |
| PV (mPa*s) | 15 | 13 | 13 |
| YP (Pa) | 22.5 | 8 | 4 |
| LSRV (cP) | 32,000 | 30,000 | 25,000 |
| Temperature (° C.) | 24.4 | 24.0 | 21.3 |

TABLE 10

Results using Potassium Chloride

| Mud Properties | Sample #1 + 5% KCl | Sample #1 + 5% KCl + 5 kg/m3 Lignite | Sample #1 + 5% KCl + 15 kg/m3 Lignite |
|---|---|---|---|
| 600 RPM | 61 | 52 | 46 |
| 300 RPM | 49 | 39 | 35 |
| 200 RPM | 45 | 35 | 32 |
| 100 RPM | 42 | 32 | 30 |
| 6 RPM | 16 | 15 | 15 |
| 3 RPM | 12 | 11 | 10 |
| 10 sec Gel (Pa) | 6 | 6 | 5 |
| PV (mPa*s) | 12 | 13 | 11 |
| YP (Pa) | 18.5 | 13 | 12 |
| LSRV (cP) | 30,000 | 18,000 | 21,000 |
| Temperature (° C.) | 20.1 | 20.1 | 20.1 |

TABLE 11

Results using Potassium Acetate

| Mud Properties | Sample #1 + 5% Pot. Acetate | Sample #1 + 5% Pot. Acetate + 5 kg/m3 Lignite | Sample #1 + 5% Pot. Acetate + 15 kg/m3 Lignite |
|---|---|---|---|
| 600 RPM | 63 | 48 | 44 |
| 300 RPM | 55 | 37 | 36 |
| 200 RPM | 51 | 36 | 34 |
| 100 RPM | 47 | 34 | 32 |
| 6 RPM | 14 | 20 | 16 |
| 3 RPM | 9 | 11 | 11 |
| 10 sec Gel (Pa) | 5 | 5 | 6 |
| PV (mPa*s) | 8 | 11 | 8 |
| YP (Pa) | 23.5 | 13 | 14 |
| LSRV (cP) | 27,000 | 14,000 | 33,000 |
| Temperature (° C.) | 20.1 | 20.1 | 20.1 |

Note:
Lignite dissolves slower.

TABLE 12

Results using Potassium Formate

| Mud Properties | Sample #1 + 5% Pot. Formate | Sample #1 + 5% Pot. Formate + 5 kg/m3 Lignite | Sample #1 + 5% Pot. Formate + 15 kg/m3 Lignite |
|---|---|---|---|
| 600 RPM | 50 | 46 | 42 |
| 300 RPM | 40 | 33 | 33 |
| 200 RPM | 37 | 30 | 30 |
| 100 RPM | 32 | 28 | 29 |
| 6 RPM | 9 | 9 | 14 |
| 3 RPM | 5 | 8 | 10 |
| 10 sec Gel (Pa) | 3 | 4 | 5 |
| PV (mPa*s) | 10 | 13 | 9 |
| YP (Pa) | 15 | 10 | 12 |
| LSRV (cP) | 30,000 | 29,000 | 31,000 |
| Temperature (° C.) | 20.1 | 20.1 | 20.1 |

TABLE 13

Results using Calcium Nitrate

| Mud Properties | Sample #1 + 5% Calcium Nitrate | Sample #1 + 5% Calcium Nitrate + 5 kg/m3 Lignite | Sample #1 + 5% Calcium Nitrate + 15 kg/m3 Lignite |
|---|---|---|---|
| 600 RPM | 58 | 49 | 44 |
| 300 RPM | 52 | 42 | 38 |
| 200 RPM | 50 | 41 | 37 |
| 100 RPM | 47 | 35 | 32 |
| 6 RPM | 12 | 11 | 14 |
| 3 RPM | 8 | 8 | 8 |
| 10 sec Gel (Pa) | 5 | 4.5 | 4.5 |
| PV (mPa*s) | 6 | 7 | 6 |
| YP (Pa) | 23 | 17.5 | 16 |
| LSRV (cP) | 35,000 | 43,000 | 23,000 |
| Temperature (° C.) | 20.1 | 20.1 | 20.1 |

Note:
Lignite dissolves slower.

TABLE 14

Results using Calcium Chloride

| Mud Properties | Sample #1 + 5% Calcium Chloride | Sample #1 + 5% Calcium Chloride + 5 kg/m3 Lignite | Sample #1 + 5% Calcium Chloride + 15 kg/m3 Lignite |
|---|---|---|---|
| 600 RPM | 63 | 48 | 43 |
| 300 RPM | 50 | 37 | 34 |
| 200 RPM | 42 | 34 | 31 |
| 100 RPM | 35 | 29 | 29 |
| 6 RPM | 13 | 12 | 13 |
| 3 RPM | 10 | 9 | 11 |
| 10 sec Gel (Pa) | 6.5 | 6.5 | 7 |
| PV (mPa*s) | 13 | 11 | 9 |
| YP (Pa) | 18.5 | 13 | 11.5 |
| LSRV (cP) | 40,000 | 37,000 | 27,000 |
| Temperature (° C.) | 20.1 | 20.1 | 20.1 |

Note:
Lignite dissolves slower.

TABLE 15

Results using Potassium Sulfate

| Mud Properties | Sample #1 + 5% Pot. Sulfate | Sample #1 + 5% Pot. Sulfate + 5 kg/m3 Lignite | Sample #1 + 5% Pot. Sulfate + 15 kg/m3 Lignite |
|---|---|---|---|
| 600 RPM | 165 | 128 | 91 |
| 300 RPM | 150 | 115 | 76 |
| 200 RPM | 143 | 109 | 71 |
| 100 RPM | 131 | 100 | 63 |
| 6 RPM | 85 | 67 | 42 |
| 3 RPM | 37 | 58 | 39 |
| 10 sec Gel (Pa) | 16 | 29 | 22 |
| PV (mPa*s) | 15 | 13 | 15 |
| YP (Pa) | 77.5 | 51 | 30.5 |
| LSRV (cP) | 100,000+ | 80,000 | 67,000 |
| Temperature (° C.) | 20.1 | 20.1 | 20.1 |

TABLE 16

Results using Sodium Sulfate

| Mud Properties | Sample #1 + 2% Sodium Sulfate | Sample #1 + 2% Sodium Sulfate + 5 kg/m3 Lignite | Sample #1 + 2% Sodium Sulfate + 15 kg/m3 Lignite |
|---|---|---|---|
| 600 RPM | 179 | 39 | 31 |
| 300 RPM | 155 | 25 | 19 |
| 200 RPM | 143 | 20 | 15 |
| 100 RPM | 123 | 14 | 9 |
| 6 RPM | 72 | 8 | 3 |
| 3 RPM | 63 | 7 | 2 |
| 10 sec Gel (Pa) | 31 | 5 | 2.5 |
| PV (mPa*s) | 24 | 14 | 13 |
| YP (Pa) | 65.5 | 5.5 | 4 |
| LSRV (cP) | 90,000 | 50,000 | 28,000 |
| Temperature (° C.) | 22.0 | 22.0 | 22.0 |

TABLE 17

Results using Sodium Sulfate

| Mud Properties | Sample #1 + 5% Sodium Sulfate | Sample #1 + 5% Sodium Sulfate + 5 kg/m3 Lignite | Sample #1 + 5% Sodium Sulfate + 15 kg/m3 Lignite |
|---|---|---|---|
| 600 RPM | 207 | 48 | 33 |
| 300 RPM | 174 | 38 | 22 |
| 200 RPM | 152 | 35 | 18 |
| 100 RPM | 124 | 31 | 13 |
| 6 RPM | 74 | 27 | 11 |
| 3 RPM | 67 | 26 | 10 |
| 10 sec Gel (Pa) | 28 | 14 | 9 |
| PV (mPa*s) | 33 | 10 | 11 |
| YP (Pa) | 70.5 | 14 | 5.5 |
| LSRV (cP) | 100,000 | 100,000 | 80,000 |
| Temperature (° C.) | 22.0 | 22.0 | 22.0 |

Example II

Background: Nr Wetaskiwin, Alberta, Drilled 222 mm hole to Intermediate Casing Depth of 1425 mMD and set casing at ~86.2 degrees inclination in the Rex Coal formation. Set and cement 177.8 mm casing.

Drilling Fluid: 60 m3 of mud is premixed with the following formulation: 30 kg/m3 of natural bentonite is pre-hydrated in fresh water for 16 hours. 3 kg/m3 of PolyVis II (MMH) is added over 2 hours. pH is raised to 12.0 with caustic via chemical barrel over pre-mix tank. Fluid becomes viscous. 50 kg/m3 of Potassium Sulphate is added.

Drilling in Coal: Intermediate casing shoe and cement are drilled out with a 156 mm bit using water and then water is displaced over to the pre-mixed system, described above. This well was drilled horizontally in the Rex Coal formation using the pre-mixed system.

Fluid Properties prior to drilling coal:
Premix: 60 m3 circulating system.
Depth: 1425 m (87.2 degrees inclination)
Funnel Viscosity: 55 s/L
Mud density: 1050 kg/m3
pH: 12.0
600 reading: 64
300 reading: 61
200 reading: 60
100 reading: 56
6 reading: 36
3 reading: 23
PV (mPa·s): 3
YP (Pa): 29
Gels (Pa): 11/11
Filtrate (Fluid Loss, mls/30 min): no control
MBT: 30 Kg/m3
Potassium ion (mg/L): 25,000
Fluid properties after drilling to 1451 m in Rex Coal formation:
Depth: 1451 m (88 degrees inclination)
Funnel Viscosity: 66 s/L
Mud density: 1060 kg/m3
pH: 11.5
600 reading: 62
300 reading: 55
200 reading:—
100 reading:—
6 reading:—
3 reading:—
PV (mPa·s): 7
YP (Pa): 24
Gels (Pa): 6/10
Filtrate (Fluid Loss, mls/30 min): 60
MBT: 24 Kg/m3
Potassium ion (mg/L): 22,000

It was determined that the fluid viscosity remained substantially stable despite drilling pure coal.

Thereafter drilling continued to 1845 m in Rex Coal formation with the addition of 15×22.7 kg sacks of non-ionic starch (Unitrol Starch) for fluid loss control into 80 m3 system:
Fluid properties at depth 1845 m (91.4 degrees inclination):
Funnel Viscosity: 59 s/L
Mud density: 1050 kg/m3
pH: 12.0
600 reading: 64
300 reading: 56
200 reading:—
100 reading:—
6 reading:—
3 reading:—
PV (mPa·s): 8
YP (Pa): 24
Gels (Pa): 9/11
Filtrate (Fluid Loss, mls/30 min): 19
MBT: 22 Kg/m3
Potassium ion (mg/L): 20.400

The addition of starch doesn't affect the rheology substantially.

After drilling to 2050 m in the Rex Coal formation the fluid properties were as follows (89 m3 system):
Depth: 2050 m (87.8 degrees inclination)
Funnel Viscosity: 85 s/L
Mud density: 1050 kg/m3
pH: 12.0
600 reading: 80
300 reading: 70
200 reading: 65
100 reading: 60
6 reading: 47
3 reading: 44
PV (mPa·s): 10
YP (Pa): 30

Gels (Pa): 17/18
Filtrate (Fluid Loss, mls/30 min): 15
MBT: 25 Kg/m3
Potassium ion (mg/L): 22.500

It was determined that a mixed metal viscosified-natural bentonite type rheology can be maintained when drilling through coal with the present system.

Example III

The Use of Calcium Sulfate in MMH Drilling Fluids

A bentonite-MMH fluid called Sample #7 was prepared using 30 kg/m³ untreated bentonite and 3 kg/m³ MMH (Polyvis II). The method proceeded as described above with additions of lignite and calcium sulfate

TABLE 17A

Results using calcium sulfate in bentonite - MMH solution

| Mud Property | Sample #7 | Sample #7 + 0.01 kg/m3 Caustic | Sample #7 + 0.04 kg/m3 Caustic |
|---|---|---|---|
| 600 RPM | 91 | 100 | 124 |
| 300 RPM | 80 | 88 | 107 |
| 200 RPM | 74 | 83 | 98 |
| 100 RPM | 66 | 76 | 86 |
| 6 RPM | 42 | 25 | 28 |
| 3 RPM | 22 | 18 | 20 |
| PV (mPa*s) | 11 | 12 | 17 |
| YP (Pa) | 34.5 | 38 | 45 |
| pH | 9.2 | 10.3 | 10.8 |

| Mud Property | Sample #7 + 20 kg/m3 Gyp | Sample #7 + 0.01 kg/m3 Caustic + 20 kg/m3 Gyp | Sample #7 + 0.04 kg/m3 Caustic + 20 kg/m3 Gyp |
|---|---|---|---|
| 600 RPM | 61 | 73 | 106 |
| 300 RPM | 53 | 63 | 96 |
| 200 RPM | 48 | 59 | 88 |
| 100 RPM | 41 | 53 | 78 |
| 6 RPM | 23 | 16 | 26 |
| 3 RPM | 11 | 13 | 21 |
| PV (mPa*s) | 8 | 10 | 10 |
| YP (Pa) | 22.5 | 26.5 | 43 |
| pH | 8.8 | 10.2 | 10.8 |

| Mud | Sample #7 + Caustic | Sample #7 + 2 kg/m3 Gyp | Sample #7 + 2 kg/m3 Gyp + 5 kg/m3 Lignite |
|---|---|---|---|
| 600 RPM | 95 | 98 | 93 |
| 300 RPM | 80 | 91 | 85 |
| 200 RPM | 76 | 89 | 78 |
| 100 RPM | 69 | 81 | 74 |
| 6 RPM | 22 | 24 | 25 |
| 3 RPM | 17 | 18 | 18 |
| PV (mPa*s) | 15 | 7 | 8 |
| YP (Pa) | 32.5 | 42 | 38.5 |
| pH | 10.7 | 10.7 | 10.0 |

| Mud | Sample #7 + Caustic + 5 kg/m3 Gyp | Sample #7 + Caustic + 5 kg/m3 Gyp + 5 kg/m3 Lignite |
|---|---|---|
| 600 RPM | 82 | 71 |
| 300 RPM | 72 | 66 |
| 200 RPM | 68 | 60 |
| 100 RPM | 60 | 53 |
| 6 RPM | 17 | 17 |
| 3 RPM | 14 | 12 |
| PV (mPa*s) | 10 | 5 |

TABLE 17A-continued

Results using calcium sulfate in bentonite - MMH solution

| YP (Pa) | 31 | 30.5 |
|---|---|---|
| pH | 10.7 | 9.8 |

Example IV

Drilling Fluids with Clay Contamination

In the following examples, drilling fluids were prepared according to the sample descriptions by hydrating the bentonite in distilled water for at least 16 hours, adding the mixed metal hydroxide moiety and adjusting the pH. Thereafter, any additives, including potassium salt and lignite, if any, were added.

Extra bentonite was added to simulate clay contamination.

The rheology properties were tested using a Fann 35 viscometer.

TABLE 18

Composition of Sample #2

| Products | Sample #2 |
|---|---|
| Untreated Bentonite | 10 ppb (28.6 kg/m3) |
| MMH | 1.0 ppb (2.86 kg/m3) |
| Caustic Soda | 0.2 ppb (to control pH at 10.0 to 12.0) |

TABLE 19

The effect of thinner on drilling fluid with normal amounts of clay but without potassium salt

| Mud Properties | Sample #2 | Sample #2 + 1 ppb lignite |
|---|---|---|
| 600 RPM | 129 | 32 |
| 300 RPM | 102 | 19.5 |
| 200 RPM | 87 | 15 |
| 100 RPM | 80 | 9 |
| 6 RPM | 25 | 1.5 |
| 3 RPM | 22 | 1.5 |
| 10 Sec Gel (lb/100 sq. ft.) | 20 | 2 |
| 10 Sec Gel (lb/100 sq. ft.) | 20 | 2 |
| PV (cpoise) | 27 | 12.5 |
| YP (lb/100 sq. ft.) | 75 | 7 |

TABLE 20

Composition of Sample #3

| Products | Sample #3 |
|---|---|
| Untreated Bentonite | 14 ppb |
| MMH | 1.0 ppb |
| Caustic Soda | 0.2 ppb |

TABLE 21

The effect of thinner on drilling fluid with higher concentrations of clay, but without potassium salt

| Mud Properties | Sample #3 | Sample #3 + 1 ppb lignite |
|---|---|---|
| 600 RPM | >300 | 45.5 |
| 300 RPM | 239 | 29 |
| 200 RPM | 199 | 22.5 |
| 100 RPM | 181.5 | 14 |
| 6 RPM | 67 | 2 |
| 3 RPM | 58 | 1.5 |
| 10 Sec Gel (lb/100 sq. ft.) | 59 | 4 |
| 10 Sec Gel (lb/100 sq. ft.) | 59 | 7 |
| PV (cpoise) | — | 16.5 |
| YP (lb/100 sq.ft.) | — | 12.5 |

TABLE 22

Composition of Sample #4

| Products | Sample #4 |
|---|---|
| Untreated Bentonite | 10 ppb |
| MMH | 1.0 ppb |
| Caustic Soda | 0.2 ppb |
| Non-Ionic Starch | 3.5 ppb |

TABLE 23

Fluid results with thinner and salt

| Mud Properties | Sample #4 | Sample #4 + 1 ppb lignite | Sample #4 + 3 ppb lignite |
|---|---|---|---|
| 600 RPM | 172.5 | 99.5 | 65.5 |
| 300 RPM | 150.5 | 70 | 43 |
| 200 RPM | 140 | 57.5 | 34 |
| 100 RPM | 128 | 41 | 23 |
| 6 RPM | 99 | 14 | 6.5 |
| 3 RPM | 98 | 11.5 | 5 |
| 10 Sec Gel (lb/100 sq. ft.) | 101 | 12 | 5.5 |
| 10 Sec Gel (lb/100 sq. ft.) | 98.5 | 15 | 7 |
| PV (cpoise) | 22 | 29.5 | 22.5 |
| YP (lb/100 sq.ft.) | 128.5 | 50.5 | 20.5 |

| Mud Properties | Sample #4 + 17.5 ppb Potassium Sulfate | Sample #4 + 17.5 ppb Potassium Sulfate + 1 ppb lignite | Sample #4 + 17.5 ppb Potassium Sulfate + 3 ppb lignite |
|---|---|---|---|
| 600 RPM | 127 | 103 | 89.5 |
| 300 RPM | 113.5 | 84.5 | 69 |
| 200 RPM | 106.5 | 76 | 59 |
| 100 RPM | 99 | 65 | 46.5 |
| 6 RPM | 47.5 | 42.5 | 22.5 |
| 3 RPM | 46 | 41 | 21 |
| 10 Sec Gel (lb/100 sq. ft.) | 34 | 41 | 23 |
| 10 Sec Gel (lb/100 sq. ft.) | 35 | 46 | 33 |
| PV (cpoise) | 13.5 | 18.5 | 19.5 |
| YP (lb/100 sq.ft.) | 100 | 66 | 49.5 |

TABLE 24

Composition of Sample #5

| Products | Sample #5 |
|---|---|
| Untreated Bentonite | 12 ppb |
| MMH | 1.0 ppb |
| Caustic Soda | 0.2 ppb |
| Non-Ionic Starch | 3.5 ppb |

TABLE 25

Fluid results with increased clay content, thinner and salt

| Mud Properties | Sample #5 | Sample #5 + 1 ppb lignite | Sample #5 + 3 ppb lignite |
|---|---|---|---|
| 600 RPM | 254 | 121.5 | 83 |
| 300 RPM | 229.5 | 90.5 | 54 |
| 200 RPM | 222 | 74 | 43 |
| 100 RPM | 204 | 53.5 | 29 |
| 6 RPM | 168 | 19.5 | 8 |
| 3 RPM | 165 | 15.5 | 6.5 |
| 10 Sec Gel (lb/100 sq. ft.) | 162 | 16 | 7 |
| 10 Sec Gel (lb/100 sq. ft.) | 164 | 19.5 | 8 |
| PV (cpoise) | 24.5 | 31 | 29 |
| YP (lb/100 sq. ft.) | 205 | 59.5 | 25 |

| Mud Properties | Sample #5 + 17.5 ppb Potassium Sulfate | Sample #5 + 17.5 ppb Potassium Sulfate + 1 ppb lignite | Sample #5 + 17.5 ppb Potassium Sulfate + 3 ppb lignite |
|---|---|---|---|
| 600 RPM | 165 | 136.5 | 104.5 |
| 300 RPM | 145 | 115 | 76 |
| 200 RPM | 133.5 | 105 | 64 |
| 100 RPM | 125.5 | 92.5 | 49 |
| 6 RPM | 68.5 | 61.5 | 24 |
| 3 RPM | 59.5 | 59 | 22 |
| 10 Sec Gel (lb/100 sq. ft.) | 41 | 62 | 25 |
| 10 Sec Gel (lb/100 sq. ft.) | 46 | 74 | 40.5 |
| PV (cpoise) | 20 | 20.5 | 28.5 |
| YP (lb/100 sq. ft.) | 125 | 94.5 | 47.5 |

TABLE 26

Composition of Sample #6

| Products | Sample #6 |
|---|---|
| Untreated Bentonite | 14 ppb |
| MMH | 1.0 ppb |
| Caustic Soda | 0.2 ppb |
| Non-Ionic Starch | 3.5 ppb |

TABLE 27

Fluid results with increased clay content, thinner and salt

| Mud Properties | Sample #6 | Sample #6 + 1 ppb lignite | Sample #6 + 3 ppb lignite |
|---|---|---|---|
| 600 RPM | >300 | 138.5 | 96 |
| 300 RPM | ~300 | 98 | 64 |
| 200 RPM | 295 | 80 | 51 |
| 100 RPM | 280 | 58 | 35 |
| 6 RPM | 233 | 21.5 | 10 |
| 3 RPM | 228 | 17 | 8 |

TABLE 27-continued

Fluid results with increased clay content, thinner and salt

| | | | |
|---|---|---|---|
| 10 Sec Gel (lb/100 sq. ft.) | 212.5 | 18 | 8.5 |
| 10 Sec Gel (lb/100 sq. ft.) | 209 | 22.5 | 9.5 |
| PV (cpoise) | 5-20 (est) | 40.5 | 32 |
| YP (lb/100 sq. ft.) | 270-290 (est) | 57.5 | 32 |

| Mud Properties | Sample #6 + 17.5 ppb Potassium Sulfate | Sample #6 + 17.5 ppb Potassium Sulfate + 1 ppb lignite | Sample #6 + 17.5 ppb Potassium Sulfate + 3 ppb lignite |
|---|---|---|---|
| 600 RPM | 194 | 157 | 111 |
| 300 RPM | 175 | 132 | 82 |
| 200 RPM | 167 | 120 | 69.5 |
| 100 RPM | 157.5 | 105 | 53 |
| 6 RPM | 127 | 73 | 25 |
| 3 RPM | 84.5 | 71.5 | 23 |
| 10 Sec Gel (lb/100 sq. ft.) | 57 | 75 | 27 |
| 10 Sec Gel (lb/100 sq. ft.) | 59 | 89 | 46 |
| PV (cpoise) | 19 | 25 | 29 |
| YP (lb/100 sq. ft.) | 156 | 107 | 53 |

TABLE 28

Fluid properties using potassium chloride

| Mud Properties | Sample #5 + 17.5 ppb Potassium Chloride | Sample #5 + 17.5 ppb Potassium Chloride + 1 ppb lignite | Sample #5 + 17.5 ppb Potassium Chloride + 3 ppb lignite |
|---|---|---|---|
| 600 RPM | 165.5 | 158 | 65.5 |
| 300 RPM | 141.5 | 140.5 | 47 |
| 200 RPM | 133.5 | 133 | 39 |
| 100 RPM | 130 | 121 | 29.9 |
| 6 RPM | 70 | 93 | 10.5 |
| 3 RPM | 55.5 | 88.5 | 10.5 |
| 10 Sec Gel (lb/100 sq. ft.) | 56 | 82 | 14 |
| 10 Sec Gel (lb/100 sq. ft.) | 63 | 82 | 29.5 |
| PV (cpoise) | 24 | 17.5 | 18.5 |
| YP (lb/100 sq. ft.) | 117.5 | 123 | 28.5 |

Example V

A well was drilled in California. Surface casing (13⅜") was set at 1935 ft, surface casing cement was drilled out with water and then displaced to the drilling fluid. A 311 mm (12¼") intermediate hole was drilled to intermediate casing point at 1843 m MD (6047 ft) with a MMH-bentonite based drilling fluid described below. At intermediate casing point 244.5 mm (9⅝") casing was run into the hole and cemented.

Drilling Fluid: 800 bbls (130 m3) of MMH-bentonite based drilling fluid was pre-mixed with the following specifications: 10 ppb natural bentonite, 1.0 ppb MMH, pH was raised to 12.0-12.3 and then 17.5 ppb potassium sulfate and non-ionic starch were added.

Drilling in clay containing formations: The formations immediately below the surface casing shoe consisted of a high content of young reactive smectite clays interspersed in sandy formations and through the drilling process some of these solids became incorporated into the drilling fluid system. The clay content of the drilling fluid, as measured by the methylene blue test (c.f. API 13), increased quickly from 10 ppb to 20 ppb equivalent and initially caused the viscosity of the drilling fluid to increase significantly. The viscosity of the fluid was reduced in a controllable way with the addition of lignite.

The clay containing horizons were interspersed within sand sections until approximately 4700 ft (1432 m). Thereafter MBT values did not increase further and gradually decreased. The well was drilled to intermediate casing point at 6047 ft (1843 mMD) where 9⅝" casing was set and cemented.

It was determined that the fluid viscosity was kept from increasing beyond useful levels despite an increase in the clay content to 20 ppb (57 kg/m3) bentonite equivalent with the use of potassium sulfate and lignite. 74 bags of lignite (50 lbs per bag) were added throughout this section into approximately 1268 bbls (~200 m3) of circulating drilling fluid.

Fluid loss was controlled with non-ionic starch additions of ~1.3 ppb 3.7 kg/m3).

TABLE 29

Daily fluid parameters of field test

| Date | Day 1 | Day 2 | Day 5 |
|---|---|---|---|
| Depth (ft) | 1946 | 4000 | 6060 |
| Density (ppg) | 10.2 | 10.2 | 10.2 |
| Funnel Viscosity (s/qt) | 34 | 35 | 53 |
| pH | 12.3 | 9.5 | 10.3 |
| 600 RPM | 21 | 52 | 51 |
| 300 RPM | 17 | 48 | 47.5 |
| 200 RPM | 15.5 | 46 | 46.5 |
| 100 RPM | 13.5 | 44 | 44.5 |
| 6 RPM | 8 | 39 | 41 |
| 3 RPM | 8 | 36 | 40 |
| 10 Sec Gel (lb/100 sq. ft.) | 7 | 35 | 38 |
| 10 Sec Gel (lb/100 sq. ft.) | 7 | 37 | 39 |
| PV (cpoise or cP) | 4 | 4 | 3.5 |
| YP (lb/100 sq. ft.) | 13 | 44 | 44 |
| Temperature (° C.) | 57 | 63 | 47 |
| MBT (ppb equiv.) | 10.5 | 20 | 20 |
| Potassium ion (ppm) | 36,000 | 31,000 | 22,500 |
| Fluid Loss (ml/30 min) | 24 | 22 | 18 |
| Total Volume (bbl) | 972 | 1268 | 1639 |
| Additives - Lignite (lbs) | 0 | 3650 | 0 |
| Total additives Lignite | 0 | 3650 | 3650 |

Example VI

Another well was drilled in California. Surface casing (9⅝") was set at 2015', surface casing cement was drilled out with water and then displaced to the drilling fluid. A 222.2 mm (8¾") production hole was drilled with a MMH-bentonite based drilling fluid. At total depth of 3018 mMD (9900 ft) 177.8 mm (7") casing was run into the hole and cemented.

Drilling Fluid: 700 bbls (110 m3) of MMH-bentonite based drilling fluid was pre-mixed with the following specifications: 15 ppb natural bentonite, 1.5-2.0 ppb MMH, pH was raised to 10.0-11.0 and then 40-45 ppb potassium sulfate and non-ionic starch were added.

Drilling in clay containing formations: The formations below the surface casing shoe consisted of a high content of young reactive smectite clays interspersed in sandy formations and through the drilling process some of these solids became incorporated into the drilling fluid system. The clay content of the drilling fluid, as measured by the methylene blue test, increased to 26 ppb equivalent and initially caused the viscosity of the drilling fluid to increase significantly.

The viscosity of the fluid was reduced in a controllable way with the addition of lignite, methyl ester of sulfonated tannin (Desco CF) and SAPP (sodium acid pyrophosphate).

The clay containing horizons were interspersed within sand sections from 3600 ft (1097 m) until approximately 8780 ft (2667 m). It was determined that the fluid viscosity was kept from increasing beyond usefulness despite an increase in the clay content to 26 ppb (74 kg/m3) bentonite equivalent with the use of potassium sulfate along with methyl ester of sulfonated tannins, SAPP and lignite. Fluid loss was controlled with non-ionic starch.

TABLE 30

Daily fluid parameters of field test

| Date | Day 3 | Day 4 | Day 5 |
|---|---|---|---|
| Depth (ft) | 5800 | 8214 | 9900 |
| Density (ppg) | 10.4 | 10.4 | 11.6 |
| Funnel Viscosity (s/qt) | 46 | 105 | 71 |
| pH | 10.6 | 10.4 | 10.4 |
| 600 RPM | 54 | 104 | 98 |
| 300 RPM | 49 | 102 | 87 |
| 200 RPM | 48 | 101 | 83 |
| 100 RPM | 45 | 97 | 77 |
| 6 RPM | 40 | 80 | 70 |
| 3 RPM | 39 | 51 | 59 |
| 10 Sec Gel (lb/100 sq. ft.) | 39 | 49 | 51 |
| 10 Sec Gel (lb/100 sq. ft.) | 41 | 52 | 57 |
| PV (cpoise or cP) | 5 | 2 | 11 |
| YP (lb/100 sq. ft.) | 44 | 100 | 76 |
| Temperature (° C.) | 49 | 63 | 74 |
| MBT (ppb equiv.) | 16.5 | 26 | 27 |
| Potassium ion (ppm) | 31,400 | 36,000 | 32,300 |
| Fluid Loss (ml/30 min) | 22 | 18 | 12 |
| Total Volume (bbl) | 916 | 1150 | 1274 |
| Additives - Lignite (lbs) | 9900 | 0 | 550 |
| Total additives Lignite | 9900 | 9900 | 10450 |
| Additives - Desco (lbs) | 2750 | 625 | 500 |
| Total additives Desco | 2750 | 3375 | 3875 |
| Additives - SAPP (lbs) | 4000 | 0 | 0 |
| Total additives SAPP | 4000 | 4000 | 4000 |

It can be seen from the experimental (lab) results and from the comparison of the lab and the field results that the addition of both potassium salt and an anionic thinner (lignite alone or lignite, SAPP and methyl ester of sulfonated tannin) provided a suitable rheological profile of the MMH-bentonite based drilling fluid while experiencing a high reactive clay content.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

I claim:

1. A method for drilling a well through a formation, the method comprising: providing a mixed metal-viscosified drilling fluid including a mixed metal viscosifier which is a mixed metal layered hydroxide compound of the following empirical formula:

$$M'_m M''_n (OH)_{(2m+3n+qa+br)} (A^q)_a (B^r)_b \cdot xH_2O,$$

where M' represents at least one divalent metal cation and m is an amount of from greater than zero to 8; where M" represents at least one trivalent metal cation and n is an amount of from greater than zero to 6; where A is an anion or negative-valence radical, and a is an amount of A ions of valence q, provided that if A is monovalent, a is from greater than zero to 8, and if A is polyvalent, a is from greater than zero to 4;

where B is a second anion or negative-valence radical, and where b is an amount of B ions of valence r and is from zero to 4; provided (m+n) is greater than or equal to 1;

further provided qa+br cannot be greater than 2m+3n; provided that qa cannot equal 2m+3n; and still further provided that (2m+3n+qa+br) is less than 3; and where xH$_2$O represents excess waters of hydration, with x being zero or more;

circulating the drilling fluid through the well while drilling into the formation;

identifying a condition of drilling indicative of a problematic increase in the clay concentration of the drilling fluid;

adding a potassium salt to the drilling fluid to bring the concentration to at least 1% w/v potassium salt; and adding an anionic thinner to the drilling fluid to adjust the viscosity of the drilling fluid, wherein a condition of drilling indicative of a problematic increase in the concentration of clay includes at least one of:

a) a funnel viscosity of 70 seconds/quart;
b) a yield point of 60 Pa;
c) for freshwater based fluids, a methylene blue test (MBT) of ≥20 ppb; or
d) for saltwater based fluids, a MBT ppb.

2. The method of claim 1 wherein providing the mixed metal-viscosified drilling fluid includes providing an aqueous-based drilling fluid including 15 to 45 kg/m3 bentonite, mixed metal viscosifier at a weight ratio of 1:8 to 1:12 relative to the weight of the bentonite and a base to maintain pH above 10.0.

3. The method of claim 1 wherein adding a potassium salt occurs during the step of providing.

4. The method of claim 1 wherein adding a potassium salt occurs after identifying.

5. The method of claim 1 wherein adding a potassium salt brings the concentration of potassium salt to 1 to 5% w/v.

6. The method of claim 1 wherein providing the mixed metal-viscosified drilling fluid includes:
mixing bentonite in water to form a bentonite mixture;
adding the mixed metal viscosifier to the bentonite mixture;
adjusting pH to greater than pH 10; and
adding the potassium salt.

7. The method of claim 1 further comprising adding any of fluid loss control additives or lost circulation materials.

8. The method of claim 1 wherein providing the mixed metal-viscosified drilling fluid provides a drilling fluid with a yield point greater than 10 Pa.

9. The method of claim 1 wherein adding an ionic thinner is initiated after identifying a condition of drilling indicative of a problematic increase in the clay concentration of the drilling fluid.

10. The method of claim 1 wherein adding an ionic thinner brings the fluid yield point to between 10 and 60 Pa.

11. The method of claim 1 wherein circulating the drilling fluid is initiated prior to drilling into a clay deposit.

12. The method of claim 1 wherein circulating the drilling fluid is maintained while a clay deposit is open to the drilling fluid.

13. The method of claim 1 wherein circulating the drilling fluid is initiated at surface.

14. The method of claim 1 wherein identifying includes determining the viscosity of the drilling fluid.

15. The method of claim 1 wherein identifying includes determining the clay concentration in the drilling fluid.

16. The method of claim 1 wherein identifying includes considering the location of the wellbore relative to a known location of a clay deposit.

17. The method of claim 1 wherein the anionic thinner is selected from the group consisting of: coal fines, lignite, lignite resin, sulphomethylated lignite, lignosulfonate, humalite, tannin including sulfonated tannin, sodium asphalt sulfonate, poly-anionic cellulose, penta potassium pyrophosphate (PKPP), sodium acid pyrophosphate, tetra sodium pyrophosphate, sulphomethylated phenolic resin or xanthan gum.

18. The method of claim 1 wherein the potassium salt is selected from the group consisting of potassium sulfate, potassium chloride, potassium acetate and potassium formate.

19. The method of claim 1 wherein the potassium salt is potassium sulfate.

20. The method of claim 1 wherein the potassium salt is potassium chloride.

21. The method of claim 6 wherein the pH is adjusted using caustic soda, caustic potash, potassium carbonate or soda ash.

22. The method of claim 1 wherein the mixed metal viscosifier is $[Mg_{0.7}Al_{0.3}(OH)_2](OH)_{0.3}$ or $Al/Mg(OH)_{4.7}Cl_{0.3}$.

23. A method for drilling a well through a formation, the method comprising: providing a mixed metal-viscosified drilling fluid including a mixed metal viscosifier which is a mixed metal layered hydroxide compound of the following empirical formula:

$$M'_m M''_n(OH)_{(2m+3n+qa+br)}(A^q)_a(B^r)_b \cdot xH_2O,$$

where M' represents at least one divalent metal cation and m is an amount of from greater than zero to 8; where M" represents at least one trivalent metal cation and n is an amount of from greater than zero to 6; where A is an anion or negative-valence radical, and a is an amount of A ions of valence q, provided that if A is monovalent, a is from greater than zero to 8, and if A is polyvalent, a is from greater than zero to 4;

where B is a second anion or negative-valence radical, and where b is an amount of B ions of valence r and is from zero to 4; provided (m+n) is greater than or equal to 1;

further provided qa+br cannot be greater than 2m+3n; provided that qa cannot equal 2m+3n; and still further provided that (2m+3n+qa+br) is less than 3; and where xH$_2$O represents excess waters of hydration, with x being zero or more;

circulating the drilling fluid through the well while drilling into the formation;

identifying a condition of drilling indicative of a problematic increase in the clay concentration of the drilling fluid;

adding calcium sulfate to the drilling fluid to bring the concentration to at least 0.05% w/v calcium sulfate in the drilling fluid; and adding an anionic thinner to the drilling fluid to adjust the viscosity of the drilling fluid, wherein a condition of drilling indicative of a problematic increase in the concentration of clay includes at least one of:

a) a funnel viscosity of 70 seconds/quart;
b) a yield point of 60 Pa;
c) for freshwater based fluids, a methylene blue test (MBT) of ≥20 ppb; or
d) for saltwater based fluids, a MBT ≥40 ppb.

24. The method of claim 23 wherein providing the mixed metal-viscosified drilling fluid includes providing an aqueous-based drilling fluid including 15 to 45 kg/m3 bentonite, mixed metal viscosifier at a weight ratio of 1:8 to 1:12 relative to the weight of the bentonite and a base to maintain pH above 10.0.

25. The method of claim 23 wherein adding a calcium sulfate occurs during the step of providing.

26. The method of claim 23 wherein adding a calcium sulfate occurs after identifying.

27. The method of claim 23 wherein adding a calcium sulfate brings the concentration of calcium sulfate to 0.05 to 1.0% w/v.

28. The method of claim 23 wherein providing the mixed metal-viscosified drilling fluid includes:
mixing bentonite in water to form a bentonite mixture;
adding the mixed metal viscosifier to the bentonite mixture;
adjusting pH to greater than pH 10; and
adding the calcium sulfate.

29. The method of claim 23 further comprising adding any of fluid loss control additives or lost circulation materials.

30. The method of claim 23 wherein providing the mixed metal-viscosified drilling fluid provides a drilling fluid with a yield point greater than 10 Pa.

31. The method of claim 23 wherein adding an ionic thinner is initiated after identifying a condition of drilling indicative of a problematic increase in the clay concentration of the drilling fluid.

32. The method of claim 23 wherein adding an ionic thinner brings the fluid yield point to between 10 and 60 Pa.

33. The method of claim 23 wherein circulating the drilling fluid is initiated prior to drilling into a clay deposit.

34. The method of claim 23 wherein circulating the drilling fluid is maintained while a clay deposit is open to the drilling fluid.

35. The method of claim 23 wherein circulating the drilling fluid is initiated at surface.

36. The method of claim 23 wherein identifying includes determining the viscosity of the drilling fluid.

37. The method of claim 23 wherein identifying includes determining the clay concentration in the drilling fluid.

38. The method of claim 23 wherein identifying includes considering the location of the wellbore relative to a known location of a clay deposit.

39. The method of claim 23 wherein the anionic thinner is selected from the group consisting of: coal fines, lignite, lignite resin, sulphomethylated lignite, lignosulfonate, humalite, tannin including sulfonated tannin, sodium asphalt sulfonate, poly-anionic cellulose, penta potassium pyrophosphate (PKPP), sodium acid pyrophosphate, tetra sodium pyrophosphate, sulphomethylated phenolic resin or xanthan gum.

40. The method of claim 23 wherein pH is adjusted using caustic soda, caustic potash, potassium carbonate or soda ash.

41. The method of claim 23 wherein the mixed metal viscosifier is $[Mg_{0.7}Al_{0.3}(OH)_2](OH)_{0.3}$ or $Al/Mg(OH)_{4.7}Cl_{0.3}$.

* * * * *